J. S. O'GORMAN.
RIM FOR AUTOMOBILE TIRES.
APPLICATION FILED SEPT. 26, 1912.
1,192,222.
Patented July 25, 1916.
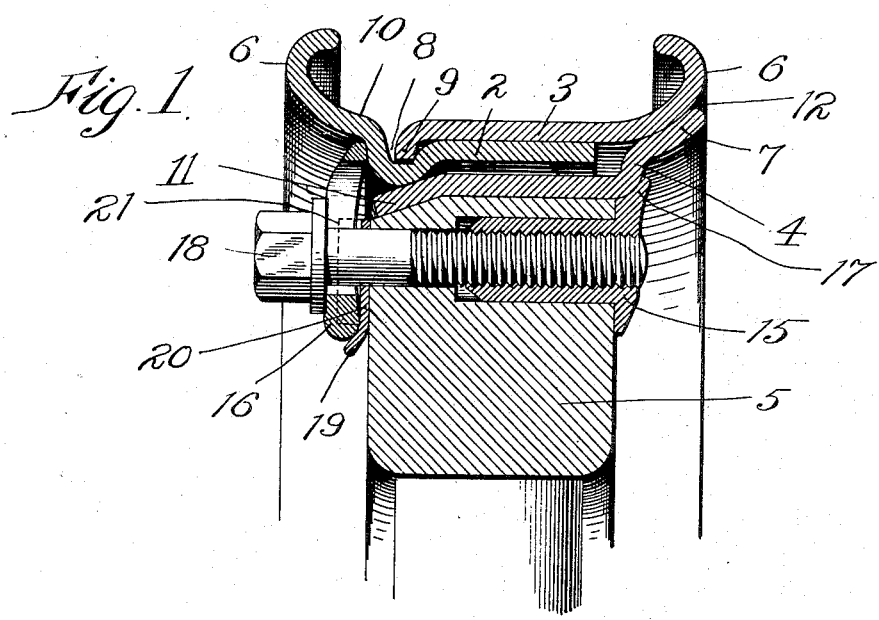
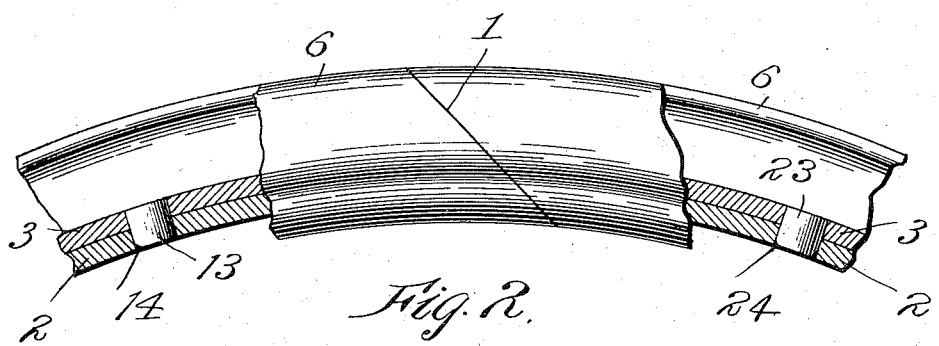

UNITED STATES PATENT OFFICE.

JOHN S. O'GORMAN, OF PORTLAND, OREGON.

RIM FOR AUTOMOBILE-TIRES.

1,192,222. Specification of Letters Patent. Patented July 25, 1916.

Application filed September 26, 1912. Serial No. 722,404.

*To all whom it may concern:*

Be it known that I, JOHN S. O'GORMAN, a citizen of the United States of America, residing at Portland, county of Multnomah, State of Oregon, have invented certain new and useful Improvements in Rims for Automobile-Tires, of which the following is a specification.

The hereinafter described invention relates to a simple, efficient and durable construction of a metallic rim for the securing of an inflatable or other form of elastic tire to the wheel of an automobile, or other vehicle. The said rim comprises two interlocking demountable circumferential rim sections or rings, with means for demountably connecting the same to the felly band of the wheel.

This application is a continuation of my application Serial No. 607,287 filed February 8, 1911.

The object of the invention is to so arrange the interlocking features of the rim sections as to permit of the said circumferential rim sections being stamped or rolled or spun out of bar or stock material of standard width and thickness such as steel bars or strips say three of four inches wide and a quarter of an inch thick, or of other convenient stock sizes. By so doing I eliminate the expensive machine work required in constructing, rolling or forming special shapes to produce the channel or circumferential seat in one member of the rim for the reception of the inclined circumferentially disposed shoulder of the interlocking other rim member or section of the demountable rim, as usually at present designed, and by thus despensing with the said machine work I reduce the expense incident to the demountable rim so as to enable the same to be successfully manufactured and placed upon the market at substantially the same price as the simple "clencher" rims, and produce a better rim and one more convenient to handle.

To comprehend the invention, reference should be had to the accompanying sheet of drawings, wherein, Figure 1 is a detail, cross section, showing a perspective view of a portion of the wheel and rim thereon, and Fig. 2 is a detail side view of the rim alone, with parts broken away.

Throughout the drawings like reference characters indicate like parts.

2 and 3 are two circumferentially disposed sections of the rim for uniting the pneumatic tire to the felly band 4 of the wheel felly 5. In the present case, 2 constitutes the inner circumferential rim section or ring, i. e. the one nearest the common axis of the rings, and 3 the outer superimposed circumferential rim section or ring which fits over the inner rim section 2. Each of said rim sections is preferably bent or spun outwardly at one edge to form a continuous flange 6, for hooking over the beads of the tire. The outer ring or section 3 is a solid ring but the inner one is cut transversely, as hereinafter described.

The inner rim section 2 has formed in it on its outer face adjacent its flanged edge a depressed circumferential groove or channel 8, usually spun or rolled therein, and the rim section 3 terminates at its corresponding edge in a depending circumferential bead 9 formed by bending down its edge, which fits into the circumferential groove or channel 8 of the inner rim section, so as to interlock the inner rim section to the outer rim section as is shown in Fig. 1 of the drawings. To enable the inner rim section 2 to be sprung apart so as to permit its being reduced in diameter and telescoped into outer section 3, the ring 2 is split transversely, preferably at an oblique angle, as shown at 1 in Fig. 2, so as to form an open or split ring, which, when sprung so that one end may slip by the other, allows of its being reduced in diameter and being slid into section 3 until the beaded edge 9 of section 3 slips into the circumferential groove or channel 8 of the inner rim section 2. When the pressure, which causes the end of split ring 2 to overlap, is released, the said ring section springs back to proper diameter and form, with its ends abutting inside the rim section 3 and locked thereto, as shown in Fig. 2. The flange 6 on inner rim section 2 is offset radially from the cylindrical, main body of said ring a distance equal to the common thickness of the material from which both rings are formed so that, while one ring fits inside the other, the two tire retaining flanges 6, 6, are equidistant from, and symmetrically disposed with reference to, the common axis of the rings, thus producing the same relative arrangement of the flanges 6, 6, as would be the case if they were spun up from one ring, as in the case of an ordinary clencher rim. The depth of the circumferential groove or channel 8 is such that the bead 9 seats itself fully therein and the upper surface of the rim section 3, when in locked position, comes flush with the inner surface 10 of the base of the flange 6 of the inner rim section 2, thus forming a smooth bottomed groove for the tire to rest in.

The under projecting surface of the bead formed by spinning groove 8 in rim section 2 bears on the frusto-conical cam surface 11 of the felly band 4, and the outer side of the base of the flange 6 on section 3, as shown at 12, nests or rides on the upwardly curved surface 7 of the felly band 4. This cam surface 11 and the concavely curved flange 7 are formed by bending the edges of the felly band 4, in and out respectively, as shown.

One of the rim sections, as 3, is provided with at least one short radial stud 13 which engages a corresponding recess 14 in the other section. This serves the purpose of preventing the rim sections slipping circumferentially one over the other when in position and in use, and concurrently insures the proper registry of the holes (not shown) through which the valve stem of the tire passes. This recess 14 for stud 13 is preferably placed near one of the two ends of split ring 2, formed by the diagonal cut shown in Fig. 2. While one such stud will suffice, still greater security is obtained by providing a second stud 23 in ring 3 which fits into a hole 24, near the other end of split ring 2.

In assembling the parts the tire is placed in position in ring 3, and the ends of split ring 2 are sprung apart radially and slightly overlapped so as to reduce the diameter of ring 2 sufficiently to permit it to be slipped into ring 3 so as to inclose the tire between the two flanges 6, 6. The bead 9 is thereby forced into the circumferential groove or channel 8 of the inner rim section, throughout nearly the entire circumference, the stud 13 being forced into the bore 14 of the inner rim section to secure proper alinement. This causes the engagement between bead 9 and groove 8 to be complete at that end of split ring 2, and this engagement extends nearly all the way around to the other end of said split ring, leaving only the last foot or two of said other end free from such engagement. The pressure of the operator's foot on the free end of split ring 2, as the rim and tire lie flat on the ground with ring 2 uppermost, can then force said free end down along the diagonal edge of the end held fast in proper position by stud 13, and snap the ring 2 into proper shape and full engagement with ring 3 along the entire circumference of bead 9 and groove 8, also bringing stud 23 into engagement with hole 24. The rim and tire are then set on felly band 4 and held tightly thereon by means of the securing bolts 18, a plurality of which are employed and located at equal distances apart throughout the circumference of the wheel. The bolts 18 pass through the wheel felly 5 and screw into the thimble nuts 15 each of which has a flange 17 which bears against the under side of the felly band 4, while the slotted collar or clamp 16 held under the head of the adjusting bolt or member 18 impinges against the outer face of the bead formed by rolling or spinning the depressed channel or groove 8 in interlocking member 2 (see Fig. 1 of the drawings). As the securing bolts 18 are tightened by screwing them into thimbles 15, the assembled interlocked rim sections are forced onto the inclines of the felly band 4 and wedged thereto, and the interlocked rim and tire are thereby securely held to the wheel. The clamp 16 is held up in position of engagement by the outwardly bent flange 19 of washer 20 carried by bolt 18. This washer also has outwardly bent side flanges one of which is indicated in dotted lines 21 in Fig. 1.

When it is desired to remove a tire from the wheel, the bolts 18 are loosened and the clamp 16 disengaged from ring 2 by dropping down the length of its slot, the two rings 2 and 3, still interlocked, and tire contained by them, are slipped off from the wheel and then by inserting an ordinary screw driver, or other wedge shaped tool, between ring 3 and one end of split ring 2, that end is sprung inward toward the common axis of the rings until it clears the other end of the split ring. This permits the two ends of split ring 2 to overlap, or slide by each other so that the diameter of said split ring 2 is reduced sufficiently to free bead 9 from groove 8, and the two rings 2 and 3 can then be easily pulled apart, freeing the tire.

Under the described construction each member of the demountable rim and the felly band may be stamped, rolled or spun from standard merchant bar or stock material special machinery not being required for such purpose. Steel strips of proper length are cut from stock material and welded into rings of proper diameter. They are then rolled or spun to form the flanges, grooves and beads, or these operations may be reversed in order. Each member of the wheel rim is substantially formed at a single operation so far as relates to the tire holding flanges and interlocking features of the rim sections. The inner ring 2 is then cut diagonally, holes punched and stud 13 inserted. The felly band is shrunk onto the wheel and fastened in the usual way and is also held in position by flange 17 of nut 15 and clamp 16.

An interlocking demountable wheel rim is thus produced at a minimum expense, and from material which could not be utilized where special machine work is required to prepare the interlocking features, as in other constructions heretofore used. Such shapes as are used in constructions now on the market have to be rolled hot at great expense and often with much difficulty.

A further advantage of my invention arises from the fact that the rim section 3, which forms the greater part of the surface in contact with the tire, is continuous and has no sharp edges to chafe or cut the tire. If any portion of the inner tube of the tire projects between the meeting edges of the outer shoe, it rests on the smooth continuous surface of ring 3 and will not be cut or chafed by any sharp edges thereon.

My invention also produces a construction, the parts of which cannot rust, nor jam together, so as to give trouble in separating them when it becomes necessary to take off a tire on the road. This is partly the result of their shapes and partly due to the fact that there are no machined surfaces but the natural skin of the metal as rolled is left in place and forms all bearing surfaces. No special tools are required to remove or replace the tire. An ordinary screw driver and a monkey wrench are all that is needed, and the work can be easily done by one person without requiring special skill or experience, and in a remarkably short time. Moreover, this facility of removal is not obtained at the expense of security. The tire is as firmly held as by a simple clencher rim, and there is no possibility of the rim sections becoming disengaged one from the other, no matter how severe strains are put on the tire by skidding the wheels, or pounding on rough roads at high speed.

While the location of the groove or channel of the inner rim section and the interlocking flange of the outer rim section as described and illustrated, is preferred, still, the same may be slightly varied if so desired without departing from the invention, which primarily resides in the formation of a demountable wheel rim composed of two interlocking overlapping members and felly band, each member being stamped, rolled or spun from a single piece of metal of substantially uniform thickness throughout. Usually this rolling or spinning can be done cold and bars or strips of the same width used to make both sections 2 and 3.

The material of both felly band and interlocking members, being rolled cold, retains its original identity, and carbon content. Whereas, if the material had to be rolled hot to form the complicated cross sections usual in demountable rims, the condition of the steel would be varied to an uncertain extent by every heating and cooling. Consequently, I am able to use a steel as furnished by the mills, having just the right specification as to carbon, which will yield but not crystallize or crack under sudden impacts and blows, which is most important, and be sure that the finished felly band and rim sections will have exactly the same carbon content, and the same desirable qualities.

Having, therefore, described my invention, I claim:

1. A demountable wheel rim for holding elastic tires which comprises in combination two rings formed of metal bands of substantially uniform thickness throughout shaped to form tire-retaining flanges on their opposite edges and having their other portions extending substantially parallel to the common axis of the rings and telescoping one inside of the other, the inner ring being cut transversely and being slightly curved in cross-section to form a circumferential groove on its outer surface, and a supporting ridge on its inner surface, and the outer ring being slightly curved in cross section to form an inwardly extending circumferential bead adapted to fit into the beforedescribed circumferential groove in the inner ring.

2. A demountable wheel rim for holding elastic tires which comprises in combination two rings formed of metal bands of substantially equal and uniform width shaped to form tire retaining flanges on their opposite edges, and telescoping one inside of the other, the inner ring being cut transversely and provided with a circumferential groove in its outer surface, and the outer ring being provided on its inner surface with an inwardly projecting circumferential bead adapted to fit into the before described groove in the inner ring.

3. A demountable wheel rim for holding elastic tires which comprises in combination two rings formed of metal bands of approximately equal and uniform width shaped to form retaining flanges on their opposite edges and telescoping one into the other, the inner ring being cut transversely and provided with a circumferential depression which forms a groove on its outer surface and a supporting rib on its inner surface, and the outer ring being provided on its inner surface with an inwardly projecting circumferential bead adapted to fit into the before-described groove in the inner ring.

4. A demountable wheel rim for holding elastic tires which comprises, in combination, two rings formed of metal bands of substantially equal and uniform width and thickness throughout, the inner ring being cut transversely to facilitate its being telescoped part way into the outer ring, said rings being bent up at their opposite edges to form tire retaining flanges equally distant from, and symmetrically disposed with reference to, the common axis of the rings, one of said rings having a recess in its unflanged portion and the other ring having a radially extending pin interlocking with said recess when the rings are assembled to form the rim.

5. A demountable wheel rim for holding pneumatic tires composed of two telescoping flanged rings, provided with interlocking grooves and beads, the inner ring being split transversely, the said split ring having a radial perforation near each end, and the outer solid ring having inwardly extending radial projections adapted to enter said perforations when the parts are assembled.

JOHN S. O'GORMAN.

Witnesses:
G. W. STAPLETON,
M. R. KLEPPER.